US009979801B2

(12) United States Patent
Jalan et al.

(10) Patent No.: US 9,979,801 B2
(45) Date of Patent: *May 22, 2018

(54) METHODS TO MANAGE SERVICES OVER A SERVICE GATEWAY

(71) Applicant: A10 Networks, Inc., San Jose, CA (US)

(72) Inventors: Rajkumar Jalan, Saratoga, CA (US); Feilong Xu, San Jose, CA (US); Rishi Sampat, Santa Clara, CA (US)

(73) Assignee: A10 NETWORKS, INC., San Jose, CA (US)

( * ) Notice: Subject to any disclaimer, the term of this patent is extended or adjusted under 35 U.S.C. 154(b) by 519 days.

This patent is subject to a terminal disclaimer.

(21) Appl. No.: 14/749,072

(22) Filed: Jun. 24, 2015

(65) Prior Publication Data

US 2015/0296058 A1 Oct. 15, 2015

Related U.S. Application Data

(63) Continuation of application No. 13/337,030, filed on Dec. 23, 2011, now Pat. No. 9,094,364.

(51) Int. Cl.
*H04L 29/08* (2006.01)
*H04L 29/12* (2006.01)
(Continued)

(52) U.S. Cl.
CPC .............. *H04L 69/22* (2013.01); *H04L 61/00* (2013.01); *H04L 61/103* (2013.01);
(Continued)

(58) Field of Classification Search
CPC ......... H04L 69/22; H04L 67/00; H04L 67/02; H04L 67/1008; H04L 67/28;
(Continued)

(56) References Cited

U.S. PATENT DOCUMENTS 5,218,602 A    6/1993  Grant et al.
5,774,660 A *  6/1998  Brendel .................. H04L 29/06
                                                            709/201

(Continued)

FOREIGN PATENT DOCUMENTS

CN    1372662 A    10/2002
CN    1449618 A    10/2003
(Continued)

OTHER PUBLICATIONS

G. Goldszmidt, G. Hunt, IBM Research Report NetDispatcher: A TCP Connection Router, RC 20853 (May 19, 1997).*
(Continued)

*Primary Examiner* — David Lazaro
*Assistant Examiner* — Robert Shaw
(74) *Attorney, Agent, or Firm* — AMPACC Law Group, LLP; Keith Kline

(57) ABSTRACT

In activating a service, a service gateway retrieves a service table entry using a service or server address of the service entry, where the service table entry has an association with another service entry. An association to the service entry is added and a marker value is set to indicate associations with two service entries. After a time duration, the association with the other service entry is removed, and the marker value is changed accordingly. In deactivating a service entry, the service gateway calculates a hash value for the service or server address of the service entry. After matching the hash value to a hash value of another service entry, an association with the other service entry is added. A marker value is set to indicate associations with two service entries. After a time duration, the association with the service entry is removed, and the marker value is changed accordingly.

19 Claims, 10 Drawing Sheets

(51) Int. Cl.
*H04L 29/06* (2006.01)
*H04L 12/26* (2006.01)
*G06F 9/50* (2006.01)

(52) U.S. Cl.
CPC ........ *H04L 61/2007* (2013.01); *H04L 61/255* (2013.01); *H04L 67/00* (2013.01); *H04L 67/02* (2013.01); *H04L 67/1008* (2013.01); *H04L 67/2814* (2013.01); *G06F 9/505* (2013.01); *H04L 43/0817* (2013.01); *H04L 61/1541* (2013.01); *H04L 67/28* (2013.01)

(58) Field of Classification Search
CPC ... H04L 67/2814; H04L 61/00; H04L 61/103; H04L 61/1541; H04L 61/2007; H04L 61/255; H04L 43/0817; G06F 9/505
See application file for complete search history.

(56) References Cited

U.S. PATENT DOCUMENTS

| | | | |
|---|---|---|---|
| 5,862,339 A | 1/1999 | Bonnaure et al. | |
| 5,875,185 A | 2/1999 | Wang et al. | |
| 5,935,207 A | 8/1999 | Logue et al. | |
| 5,958,053 A | 9/1999 | Denker | |
| 5,995,981 A | 11/1999 | Wikstrom | |
| 6,003,069 A | 12/1999 | Cavill | |
| 6,047,268 A | 4/2000 | Bartoli et al. | |
| 6,075,783 A | 6/2000 | Voit | |
| 6,131,163 A | 10/2000 | Wiegel | |
| 6,219,706 B1 | 4/2001 | Fan et al. | |
| 6,259,705 B1 * | 7/2001 | Takahashi | H04L 47/10 370/230 |
| 6,321,338 B1 | 11/2001 | Porras et al. | |
| 6,374,300 B2 | 4/2002 | Masters | |
| 6,456,617 B1 | 9/2002 | Oda et al. | |
| 6,459,682 B1 | 10/2002 | Ellesson et al. | |
| 6,483,600 B1 | 11/2002 | Schuster et al. | |
| 6,535,516 B1 | 3/2003 | Leu et al. | |
| 6,578,066 B1 | 6/2003 | Logan et al. | |
| 6,587,866 B1 * | 7/2003 | Modi | H04L 29/06 709/226 |
| 6,600,738 B1 | 7/2003 | Alperovich et al. | |
| 6,658,114 B1 | 12/2003 | Farn et al. | |
| 6,667,980 B1 * | 12/2003 | Modi | H04L 29/06 370/395.32 |
| 6,748,414 B1 | 6/2004 | Boumas | |
| 6,772,205 B1 | 8/2004 | Lavian et al. | |
| 6,772,334 B1 | 8/2004 | Glawitsch | |
| 6,779,017 B1 | 8/2004 | Lamberton et al. | |
| 6,779,033 B1 | 8/2004 | Watson et al. | |
| 6,804,224 B1 | 10/2004 | Schuster et al. | |
| 6,836,462 B1 * | 12/2004 | Albert | H04L 29/06 370/235 |
| 6,952,728 B1 | 10/2005 | Alles et al. | |
| 7,010,605 B1 | 3/2006 | Dharmarajan | |
| 7,013,482 B1 | 3/2006 | Krumel | |
| 7,058,718 B2 | 6/2006 | Fontes et al. | |
| 7,069,438 B2 | 6/2006 | Balabine et al. | |
| 7,076,555 B1 | 7/2006 | Orman et al. | |
| 7,143,087 B2 | 11/2006 | Fairweather | |
| 7,167,927 B2 | 1/2007 | Philbrick et al. | |
| 7,181,524 B1 | 2/2007 | Lele | |
| 7,218,722 B1 | 5/2007 | Turner et al. | |
| 7,228,359 B1 | 6/2007 | Monteiro | |
| 7,234,161 B1 | 6/2007 | Maufer et al. | |
| 7,236,457 B2 | 6/2007 | Joe | |
| 7,254,133 B2 | 8/2007 | Govindarajan et al. | |
| 7,269,850 B2 | 9/2007 | Govindarajan et al. | |
| 7,277,963 B2 | 10/2007 | Dolson et al. | |
| 7,301,899 B2 | 11/2007 | Goldstone | |
| 7,308,499 B2 | 12/2007 | Chavez | |
| 7,310,686 B2 | 12/2007 | Uysal | |
| 7,321,926 B1 * | 1/2008 | Zhang | G06F 9/5033 455/453 |
| 7,328,267 B1 | 2/2008 | Bashyam et al. | |
| 7,334,232 B2 | 2/2008 | Jacobs et al. | |
| 7,337,241 B2 | 2/2008 | Boucher et al. | |
| 7,343,399 B2 | 3/2008 | Hayball et al. | |
| 7,349,970 B2 | 3/2008 | Clement et al. | |
| 7,370,353 B2 | 5/2008 | Yang | |
| 7,373,500 B2 | 5/2008 | Ramelson et al. | |
| 7,391,725 B2 | 6/2008 | Huitema et al. | |
| 7,398,317 B2 | 7/2008 | Chen et al. | |
| 7,423,977 B1 | 9/2008 | Joshi | |
| 7,430,755 B1 | 9/2008 | Hughes et al. | |
| 7,463,648 B1 | 12/2008 | Eppstein et al. | |
| 7,467,202 B2 | 12/2008 | Savchuk | |
| 7,472,190 B2 | 12/2008 | Robinson | |
| 7,492,766 B2 | 2/2009 | Cabeca et al. | |
| 7,506,360 B1 | 3/2009 | Wilkinson et al. | |
| 7,509,369 B1 | 3/2009 | Tormasov | |
| 7,512,980 B2 | 3/2009 | Copeland et al. | |
| 7,533,409 B2 | 5/2009 | Keane et al. | |
| 7,552,323 B2 | 6/2009 | Shay | |
| 7,584,262 B1 * | 9/2009 | Wang | H04L 12/4625 709/217 |
| 7,584,301 B1 | 9/2009 | Joshi | |
| 7,590,736 B2 | 9/2009 | Hydrie et al. | |
| 7,610,622 B2 | 10/2009 | Touitou et al. | |
| 7,613,193 B2 | 11/2009 | Swami et al. | |
| 7,613,822 B2 * | 11/2009 | Joy | H04L 29/06 709/227 |
| 7,673,072 B2 | 3/2010 | Boucher et al. | |
| 7,675,854 B2 | 3/2010 | Chen et al. | |
| 7,703,102 B1 | 4/2010 | Eppstein et al. | |
| 7,707,295 B1 | 4/2010 | Szeto et al. | |
| 7,711,790 B1 | 5/2010 | Barrett et al. | |
| 7,733,866 B2 | 6/2010 | Mishra et al. | |
| 7,747,748 B2 | 6/2010 | Allen | |
| 7,765,328 B2 | 7/2010 | Bryers et al. | |
| 7,792,113 B1 | 9/2010 | Foschiano et al. | |
| 7,808,994 B1 | 10/2010 | Vinokour et al. | |
| 7,826,487 B1 | 11/2010 | Mukerji et al. | |
| 7,881,215 B1 | 2/2011 | Daigle et al. | |
| 7,948,952 B2 | 5/2011 | Hurtta et al. | |
| 7,965,727 B2 | 6/2011 | Sakata et al. | |
| 7,970,934 B1 | 6/2011 | Patel | |
| 7,979,694 B2 | 7/2011 | Touitou et al. | |
| 7,983,258 B1 | 7/2011 | Ruben et al. | |
| 7,990,847 B1 * | 8/2011 | Leroy | H04L 43/0817 370/216 |
| 7,991,859 B1 | 8/2011 | Miller et al. | |
| 7,992,201 B2 | 8/2011 | Aldridge et al. | |
| 8,019,870 B1 | 9/2011 | Eppstein et al. | |
| 8,032,634 B1 | 10/2011 | Eppstein et al. | |
| 8,081,640 B2 | 12/2011 | Ozawa et al. | |
| 8,090,866 B1 | 1/2012 | Bashyam et al. | |
| 8,099,492 B2 | 1/2012 | Dahlin et al. | |
| 8,116,312 B2 | 2/2012 | Riddoch et al. | |
| 8,122,116 B2 | 2/2012 | Matsunaga et al. | |
| 8,151,019 B1 | 4/2012 | Le et al. | |
| 8,179,809 B1 | 5/2012 | Eppstein et al. | |
| 8,185,651 B2 | 5/2012 | Moran et al. | |
| 8,191,106 B2 | 5/2012 | Choyi et al. | |
| 8,224,971 B1 | 7/2012 | Miller et al. | |
| 8,261,339 B2 | 9/2012 | Aldridge et al. | |
| 8,266,235 B2 | 9/2012 | Jalan et al. | |
| 8,296,434 B1 | 10/2012 | Miller et al. | |
| 8,312,507 B2 | 11/2012 | Chen et al. | |
| 8,379,515 B1 | 2/2013 | Mukerji | |
| 8,499,093 B2 | 7/2013 | Grosser et al. | |
| 8,539,075 B2 | 9/2013 | Bali et al. | |
| 8,554,929 B1 | 10/2013 | Szeto et al. | |
| 8,559,437 B2 | 10/2013 | Mishra et al. | |
| 8,560,693 B1 | 10/2013 | Wang et al. | |
| 8,584,199 B1 | 11/2013 | Chen et al. | |
| 8,595,791 B1 | 11/2013 | Chen et al. | |
| RE44,701 E | 1/2014 | Chen et al. | |
| 8,675,488 B1 | 3/2014 | Sidebottom et al. | |
| 8,681,610 B1 | 3/2014 | Mukerji | |
| 8,750,164 B2 | 6/2014 | Casado et al. | |
| 8,782,221 B2 | 7/2014 | Han | |
| 8,813,180 B1 | 8/2014 | Chen et al. | |

(56) References Cited

U.S. PATENT DOCUMENTS

| | | |
|---|---|---|
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,137,301 B1 | 9/2015 | Dunlap et al. |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 9,531,846 B2 | 12/2016 | Han et al. |
| 2001/0042200 A1 | 11/2001 | Lamberton et al. |
| 2001/0049741 A1 | 12/2001 | Skene et al. |
| 2001/0052024 A1* | 12/2001 | Devarakonda ...... H04L 67/1008 709/238 |
| 2002/0026515 A1 | 2/2002 | Michielsens et al. |
| 2002/0032777 A1 | 3/2002 | Kawata et al. |
| 2002/0032799 A1 | 3/2002 | Wiedeman et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0141386 A1 | 10/2002 | Minert et al. |
| 2002/0143991 A1 | 10/2002 | Chow et al. |
| 2002/0178259 A1 | 11/2002 | Doyle et al. |
| 2002/0188678 A1 | 12/2002 | Edecker et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1* | 2/2003 | Wang ................. H04L 29/06 370/349 |
| 2003/0035420 A1 | 2/2003 | Niu |
| 2003/0061506 A1 | 3/2003 | Cooper et al. |
| 2003/0065762 A1 | 4/2003 | Stolorz et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0154306 A1* | 8/2003 | Perry ................. H04L 29/12009 709/245 |
| 2003/0179775 A1* | 9/2003 | Carolan ............... H04L 29/06 370/469 |
| 2003/0195962 A1 | 10/2003 | Kikuchi et al. |
| 2003/0210694 A1* | 11/2003 | Jayaraman .......... H04L 67/1008 370/392 |
| 2004/0010545 A1 | 1/2004 | Pandya |
| 2004/0062246 A1 | 4/2004 | Boucher et al. |
| 2004/0073703 A1 | 4/2004 | Boucher et al. |
| 2004/0078419 A1* | 4/2004 | Ferrari ................ H04L 29/06 709/201 |
| 2004/0078480 A1 | 4/2004 | Boucher et al. |
| 2004/0103315 A1 | 5/2004 | Cooper et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213155 A1 | 10/2004 | Collett et al. |
| 2004/0250059 A1 | 12/2004 | Ramelson et al. |
| 2004/0260745 A1* | 12/2004 | Gage ................. H04L 29/12009 709/200 |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021725 A1* | 1/2005 | Lobbert ............... H04W 48/16 709/223 |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0039033 A1 | 2/2005 | Meyers et al. |
| 2005/0044270 A1 | 2/2005 | Grove et al. |
| 2005/0074013 A1 | 4/2005 | Hershey et al. |
| 2005/0080890 A1* | 4/2005 | Yang ................... H04L 67/1008 709/223 |
| 2005/0102400 A1* | 5/2005 | Nakahara ............ H04L 29/06 709/225 |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0281190 A1 | 12/2005 | McGee et al. |
| 2006/0013227 A1* | 1/2006 | Kannan ............... H04L 29/06 370/392 |
| 2006/0023721 A1 | 2/2006 | Miyake et al. |
| 2006/0029076 A1* | 2/2006 | Namihira ............ H04L 29/1233 370/392 |
| 2006/0036610 A1 | 2/2006 | Wang |
| 2006/0036733 A1 | 2/2006 | Fujimoto et al. |
| 2006/0041745 A1 | 2/2006 | Parnes |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0164978 A1 | 7/2006 | Werner et al. |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0022479 A1 | 1/2007 | Sikdar et al. |
| 2007/0076653 A1 | 4/2007 | Park et al. |
| 2007/0086382 A1 | 4/2007 | Narayanan et al. |
| 2007/0088822 A1* | 4/2007 | Coile .................. H01R 31/005 709/224 |
| 2007/0094396 A1 | 4/2007 | Takano et al. |
| 2007/0118881 A1 | 5/2007 | Mitchell et al. |
| 2007/0124502 A1 | 5/2007 | Li |
| 2007/0156919 A1 | 7/2007 | Potti et al. |
| 2007/0165622 A1 | 7/2007 | O'Rourke et al. |
| 2007/0180119 A1 | 8/2007 | Khivesara et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1 | 10/2007 | Park et al. |
| 2007/0243879 A1 | 10/2007 | Park et al. |
| 2007/0245090 A1 | 10/2007 | King et al. |
| 2007/0248009 A1 | 10/2007 | Petersen |
| 2007/0259673 A1 | 11/2007 | Willars et al. |
| 2007/0283429 A1 | 12/2007 | Chen et al. |

(56) References Cited

U.S. PATENT DOCUMENTS

| | | |
|---|---|---|
| 2007/0286077 A1 | 12/2007 | Wu |
| 2007/0288247 A1 | 12/2007 | Mackay |
| 2007/0294209 A1 | 12/2007 | Strub et al. |
| 2008/0016161 A1 | 1/2008 | Tsirtsis et al. |
| 2008/0031263 A1 | 2/2008 | Ervin et al. |
| 2008/0076432 A1 | 3/2008 | Senarath et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0120129 A1 | 5/2008 | Seubert et al. |
| 2008/0134332 A1 | 6/2008 | Keohane et al. |
| 2008/0162679 A1 | 7/2008 | Maher et al. |
| 2008/0225722 A1 | 9/2008 | Khemani et al. |
| 2008/0228781 A1 | 9/2008 | Chen et al. |
| 2008/0250099 A1 | 10/2008 | Shen et al. |
| 2008/0253390 A1 | 10/2008 | Das et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2008/0298303 A1 | 12/2008 | Tsirtsis |
| 2009/0024722 A1 | 1/2009 | Sethuraman et al. |
| 2009/0031415 A1 | 1/2009 | Aldridge et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1* | 4/2009 | Singhal ................ H04L 67/104 370/351 |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0285196 A1 | 11/2009 | Lee et al. |
| 2009/0313379 A1 | 12/2009 | Rydnell et al. |
| 2009/0328054 A1* | 12/2009 | Paramasivam ....... G06F 9/5033 718/105 |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0042869 A1 | 2/2010 | Szabo et al. |
| 2010/0054139 A1 | 3/2010 | Chun et al. |
| 2010/0061272 A1* | 3/2010 | Veillette ................ H04L 45/34 370/254 |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0095018 A1 | 4/2010 | Khemani et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0138535 A1* | 6/2010 | Jerrim .................. G06F 21/552 709/224 |
| 2010/0162378 A1 | 6/2010 | Jayawardena et al. |
| 2010/0205310 A1 | 8/2010 | Altshuler et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1* | 9/2010 | Szeto ................ H04L 67/1002 709/225 |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1* | 10/2010 | Chao .................. H04L 12/66 370/235 |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1* | 12/2010 | Pope .................. H04L 47/10 718/103 |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1* | 2/2011 | Singh ................ H04L 63/0263 709/246 |
| 2011/0060831 A1 | 3/2011 | Ishii et al. |
| 2011/0083174 A1 | 4/2011 | Aldridge et al. |
| 2011/0093522 A1 | 4/2011 | Chen et al. |
| 2011/0093586 A1* | 4/2011 | Garcia-Luna-Aceves ....... G06F 12/1483 709/224 |
| 2011/0099403 A1 | 4/2011 | Miyata et al. |
| 2011/0099623 A1 | 4/2011 | Garrard et al. |
| 2011/0110294 A1 | 5/2011 | Valluri et al. |
| 2011/0145324 A1 | 6/2011 | Reinart et al. |
| 2011/0149879 A1 | 6/2011 | Noriega et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshchandra et al. |
| 2011/0307541 A1* | 12/2011 | Walsh ................ H04L 67/1034 709/203 |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117382 A1 | 5/2012 | Larson et al. |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0179770 A1 | 7/2012 | Jalan et al. |
| 2012/0191839 A1 | 7/2012 | Maynard |
| 2012/0215910 A1 | 8/2012 | Wada |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0311116 A1 | 12/2012 | Jalan et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0135996 A1 | 5/2013 | Torres et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |

(56) References Cited

U.S. PATENT DOCUMENTS

| | | |
|---|---|---|
| 2013/0250765 A1 | 9/2013 | Ehsan et al. |
| 2013/0258846 A1 | 10/2013 | Damola |
| 2013/0282791 A1 | 10/2013 | Kruglick |
| 2014/0012972 A1 | 1/2014 | Han |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0026794 A1 | 1/2015 | Zuk et al. |
| 2015/0039671 A1 | 2/2015 | Jalan et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0244566 A1 | 8/2015 | Puimedon |
| 2015/0281087 A1 | 10/2015 | Jalan et al. |
| 2015/0281104 A1 | 10/2015 | Golshan et al. |
| 2015/0312092 A1 | 10/2015 | Golshan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0014126 A1 | 1/2016 | Jalan et al. |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0156708 A1 | 6/2016 | Jalan et al. |
| 2016/0173579 A1 | 6/2016 | Jalan et al. |
| 2017/0048107 A1 | 2/2017 | Dosovitsky et al. |
| 2017/0048356 A1 | 2/2017 | Thompson et al. |

FOREIGN PATENT DOCUMENTS

| | | |
|---|---|---|
| CN | 1473300 A | 2/2004 |
| CN | 1529460 A | 9/2004 |
| CN | 1575582 A | 2/2005 |
| CN | 1714545 A | 12/2005 |
| CN | 1725702 A | 1/2006 |
| CN | 1910869 A | 2/2007 |
| CN | 101004740 A | 7/2007 |
| CN | 101094225 A | 12/2007 |
| CN | 101163336 A | 4/2008 |
| CN | 101169785 A | 4/2008 |
| CN | 101189598 A | 5/2008 |
| CN | 101193089 A | 6/2008 |
| CN | 101247349 A | 8/2008 |
| CN | 101261644 A | 9/2008 |
| CN | 101442425 A | 5/2009 |
| CN | 101495993 A | 7/2009 |
| CN | 101682532 A | 3/2010 |
| CN | 101878663 A | 11/2010 |
| CN | 102123156 A | 7/2011 |
| CN | 102143075 A | 8/2011 |
| CN | 102546590 A | 7/2012 |
| CN | 102571742 A | 7/2012 |
| CN | 102577252 A | 7/2012 |
| CN | 102918801 A | 2/2013 |
| CN | 103533018 A | 1/2014 |
| CN | 103944954 A | 7/2014 |
| CN | 104040990 A | 9/2014 |
| CN | 104067569 A | 9/2014 |
| CN | 104106241 A | 10/2014 |
| CN | 104137491 A | 11/2014 |
| CN | 104796396 A | 7/2015 |
| CN | 102577252 B | 3/2016 |
| CN | 102918801 B | 5/2016 |
| CN | 102571742 B | 7/2016 |
| EP | 1209876 A2 | 5/2002 |
| EP | 1770915 A1 | 4/2007 |
| EP | 1885096 A1 | 2/2008 |
| EP | 02296313 | 3/2011 |
| EP | 2577910 A2 | 4/2013 |
| EP | 2622795 A2 | 8/2013 |
| EP | 2647174 A2 | 10/2013 |
| EP | 2760170 A1 | 7/2014 |
| EP | 2772026 A1 | 9/2014 |
| EP | 2901308 A2 | 8/2015 |
| EP | 2760170 B1 | 12/2015 |
| HK | 1182560 | 11/2013 |
| HK | 1183569 | 12/2013 |
| HK | 1183996 | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A | 8/2015 |
| IN | Journal39/2015 | 9/2015 |
| IN | 261CHE2014 A | 7/2016 |
| IN | 1668CHENP2015 A | 7/2016 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 A | 7/2013 |
| JP | 2014504484 A | 2/2014 |
| JP | 2014143686 A | 8/2014 |
| JP | 2015507380 A | 3/2015 |
| JP | 5855663 B2 | 12/2015 |
| JP | 5906263 B2 | 4/2016 |
| JP | 5913609 B2 | 4/2016 |
| JP | 5946189 B2 | 6/2016 |
| KR | 100830413 B1 | 5/2008 |
| KR | 20130096624 A | 8/2013 |
| KR | 101576585 B1 | 12/2015 |
| KR | 101632187 B1 | 6/2016 |
| TW | 269763 B | 2/1996 |
| TW | 425821 B | 3/2001 |
| TW | 444478 B | 7/2001 |
| WO | WO2001013228 | 2/2001 |
| WO | WO2001014990 | 3/2001 |
| WO | WO2001045349 | 6/2001 |
| WO | WO2003103237 | 12/2003 |
| WO | WO2004084085 A1 | 9/2004 |
| WO | WO2006098033 A1 | 9/2006 |
| WO | WO2008053954 A1 | 5/2008 |
| WO | WO2008078593 A1 | 7/2008 |
| WO | WO2011049770 A2 | 4/2011 |
| WO | WO2011079381 A1 | 7/2011 |
| WO | WO2011149796 A2 | 12/2011 |
| WO | WO2012050747 A2 | 4/2012 |
| WO | WO2012075237 A2 | 6/2012 |
| WO | WO2012083264 A2 | 6/2012 |
| WO | WO2012097015 A2 | 7/2012 |
| WO | WO2013070391 A1 | 5/2013 |
| WO | WO2013081952 A1 | 6/2013 |
| WO | WO2013096019 A1 | 6/2013 |
| WO | WO2013112492 A1 | 8/2013 |
| WO | WO2014031046 A1 | 2/2014 |

(56) References Cited

FOREIGN PATENT DOCUMENTS

| | | |
|---|---|---|
| WO | WO2014052099 A2 | 4/2014 |
| WO | WO2014088741 A1 | 6/2014 |
| WO | WO2014093829 A1 | 6/2014 |
| WO | WO2014138483 A1 | 9/2014 |
| WO | WO2014144837 A1 | 9/2014 |
| WO | WO2014179753 A2 | 11/2014 |
| WO | WO2015153020 A1 | 10/2015 |
| WO | WO2015164026 A1 | 10/2015 |

OTHER PUBLICATIONS

Mario Baldi; Fulvio Risso; Cascarano N.; Andrea Baldini Service-Based Traffic Classification: Principles and Validation. In: 2009 IEEE Sarnoff Symposium, Princeton, New Jersey, Jan. 3, 2009. pp. 1-6.*

PCT/US2012/069026 Written Opinion of the International Searching Authority, dated Mar. 11, 2013.*

"Enhanced Interior Gateway Routing Protocol", Cisco, Document ID 16406, Sep. 9, 2005 update, 43 pages.

Crotti, Manuel et al., "Detecting HTTP Tunnels with Statistical Mechanisms", IEEE International Conference on Communications, Jun. 24-28, 2007, pp. 6162-6168.

Haruyama, Takahiro et al., "Dial-to-Connect VPN System for Remote DLNA Communication", IEEE Consumer communications and Networking Conference, CCNC 2008. 5th IEEE, Jan. 10-12, 2008, pp. 1224-1225.

Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.

"EIGRP MPLS VPN PE-CE Site of Origin (SoO)", Cisco Systems, Feb. 28, 2006, 14 pages.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.

"Tcp—TCP Protocol", Linux Programmer's Manual, accessed Apr. 13, 2016 at URL: <<https://www.freebsd.org/cgi/man.cgi?query=tcp&apropos=0&,sektion=7&manpath=SuSE+Linux%2Fi386+11.0&format=asci>>, Nov. 25, 2007, 11 pages.

Cardellini et al., "Dynamic Load Balancing on Web-server Systems", IEEE Internet Computing, vol. 3, No. 3, pp. 28-39, May-Jun. 1999.

Spatscheck et al., "Optimizing TCP Forwarder Performance", IEEE/ACM Transactions on Networking, vol. 8, No. 2, Apr. 2000.

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

Goldszmidt et al. NetDispatcher: A TCP Connection Router, IBM Research Report RC 20853, May 19, 1997.

* cited by examiner

METHODS TO MANAGE SERVICES OVER A SERVICE GATEWAY

CROSS REFERENCE TO RELATED APPLICATION

This non-provisional patent application claims the benefit of, and is a continuation of, U.S. patent application Ser. No. 13/337,030 titled "Methods to Manage Services over a Service Gateway,"filed Dec. 23, 2011, which is hereby incorporated by reference in its entirety including all references cited therein.

BACKGROUND OF THE INVENTION

Field

This invention relates generally to data communications, and more specifically, to a service gateway.

Background

Service gateways such as server load balancers, firewalls, or traffic managers are typically deployed to bridge services between client computing devices and application servers. The number of client computing devices proliferates in past few years in the areas of consumer computers, mobile computing devices, smartphones, and gaming devices.

When the number of client devices increases, the number of service sessions between client devices and application servers increases accordingly. Traditional stateful session packet processing used by service gateways gives way to stateless packet processing. Stateless packet processing is more efficient in computation and in memory consumption. It suits well in order to scale up services for an expected large number of service sessions. A typical stateless packet processing method uses a form of hash table. The table is stored with predetermined servers and applications information.

At the same time, the number of applications also increases rapidly as consumers and corporations install new applications on their computing devices. More servers are installed every day, and more applications become available every hour. In order to activate a server or an application in a server, operator needs to update the hash table with the additional server or application information. Often times, updating the table means replacing an existing server or application information of a table entry with the activating server or application information. Such table entry content replacement is disruptive to on-going service session using the existing table entry. Data packets of any on-going service session would not be forwarded to the proper server or client device. For example, if a consumer is watching a Netflix™ streaming video, the video stream will be abruptly stopped. If a corporate worker is in the middle of a business transaction, the transaction will be stalled. The worker needs to restart the transaction. In a worst case, the worker may need to find out which part of the transaction had been completed in order to avoid duplicating the completed portion of the transaction.

In addition to activating a new server or application, during maintenance such as backup, software update, hardware replacement, servers and applications are often taken off line. The corresponding table entries will also need to be replaced as the server or the application on a server is no longer available at the table entry. It is desirable to replace the table entry with a second server or another server running the same application.

It is highly desirable to have a stateless packet processing method while services can be managed to allow a server or an application on a server to be added or removed, without interrupting existing service sessions.

Therefore, there is a need for a method to manage services over a service gateway using stateless packet processing method.

BRIEF SUMMARY OF THE INVENTION

According to one embodiment of the present invention, a method for managing services by a service gateway comprises: (a) receiving a first service entry for a service to be activated by the service gateway, the first service entry comprising a first service address associated with the first service and a first server address; (b) retrieving a service table entry of a service mapping table using the first service address or the first server address of the first service entry, the service table entry having an association with a second service entry, the second service entry comprising a second service address and a second server address; (c) adding to the service table entry an association to the first service entry; (d) storing a marker value associated with the service table entry to indicate that the service table entry is associated with a plurality of service entries; (e) setting a timer associated with the service table entry to a predetermined duration; (f) in response to an expiration of the timer, removing the association with the second service entry from the service table entry; and (g) in response to removing the association with the second service from the service table entry, changing the marker value to indicate that the service table entry is not associated with a plurality of service entries.

In one aspect of the present invention, prior to the removing of the association with the second service entry from the service table entry, the method further comprises: (h) receiving a data packet by the service gateway from a host, the data packet comprising a third service address; (i) comparing the third service address of the data packet with the first service address of the first service entry or with the second service address of the second service entry; (j) in response to finding a match between the third service address and the first service address, or between the third service address and the second service address, determining the marker value associated with the service table entry; (k) in response to determining that the marker value indicates that the service table entry is associated with a plurality of service entries, creating a session entry based on the service table entry and storing the session entry in a session table; (l) in response to finding the match between the third service address and the first service address, modifying the data packet by replacing the third service address with the first server address; (m) in response to finding the match between the third service address and the second service address, modifying the data packet by replacing the third service address with the second server address; and (n) sending the modified data packet to the first server address or the second server address.

In one aspect of the present invention, prior to the removing of the association with the second service entry from the service table entry, the method further comprises: (h) receiving a data packet by the service gateway from a server, the data packet comprising a third server address; (i) comparing the third server address of the data packet with the first server address of the first service entry or with the second server address of the second service entry; (j) in response to finding a match between the third server address and the first server address, or between the third server address and the second server address, determining the marker value associated with the service table entry; (k) in response to determining that the marker value indicates that the service table entry is associated with a plurality of service entries, creating a session entry based on the service table entry and storing the session entry in a session table; (l) in response to finding the match between the third server address and the first server address, modifying the data packet by replacing the third server address with the first service address; (m) in response to finding the match between the third server address and the second server address, modifying the data packet by replacing the third server address with the second service address; and (n) sending the modified data packet to a host address from the data packet.

In one aspect of the present invention, the receiving (h) comprises: (h1) receiving the data packet from the host; (h2) comparing the data packet against session entries in the session table; (h3) in response to finding a match between the data packet and a given session entry in the session table: (h3i) modifying the data packet by replacing the third service address with a given server address in the given session entry; (h3ii) skipping the comparing (i), the determining (j), the creating (k), the modifying (l), the modifying (m), and the sending (n); and (h3iii) sending the modified data packet to the given server address; and (h4) in response to finding no matches between the data packet and the session entries, performing the comparing (i), the determining (j), the creating (k), the modifying (l), the modifying (m), and the sending (n).

In one embodiment of the present invention, a method for managing services by a service gateway, comprises: (a) receiving an indication to deactivate a first service entry for a service, the first service entry comprising a first service address associated with the service and a first server address, the first service entry associated with a service table entry of a service mapping table; (b) calculating a first hash value for the first service address or the first server address of the first service entry; (c) determining whether a second hash value of a second service entry in the service mapping table matches the first hash value, the second service entry comprising a second service address and a second server address; (d) in response to determining that the second hash value matches the first hash value, adding an association with the second service entry to the service table entry; (e) storing a marker value associated with the service table entry to indicate that the service table entry is associated with a plurality of service entries; (f) setting a timer associated with the service table entry to a predetermined duration; (g) in response to an expiration of the timer, removing the association with the first service entry from the service table entry; and (h) in response to removing the association with the first service entry from the service table entry, changing the marker value to indicate that the service table entry is not associated with a plurality of service entries.

System and computer program products corresponding to the above-summarized methods are also described and claimed herein.

DETAILED DESCRIPTION OF THE INVENTION

Figure 1:
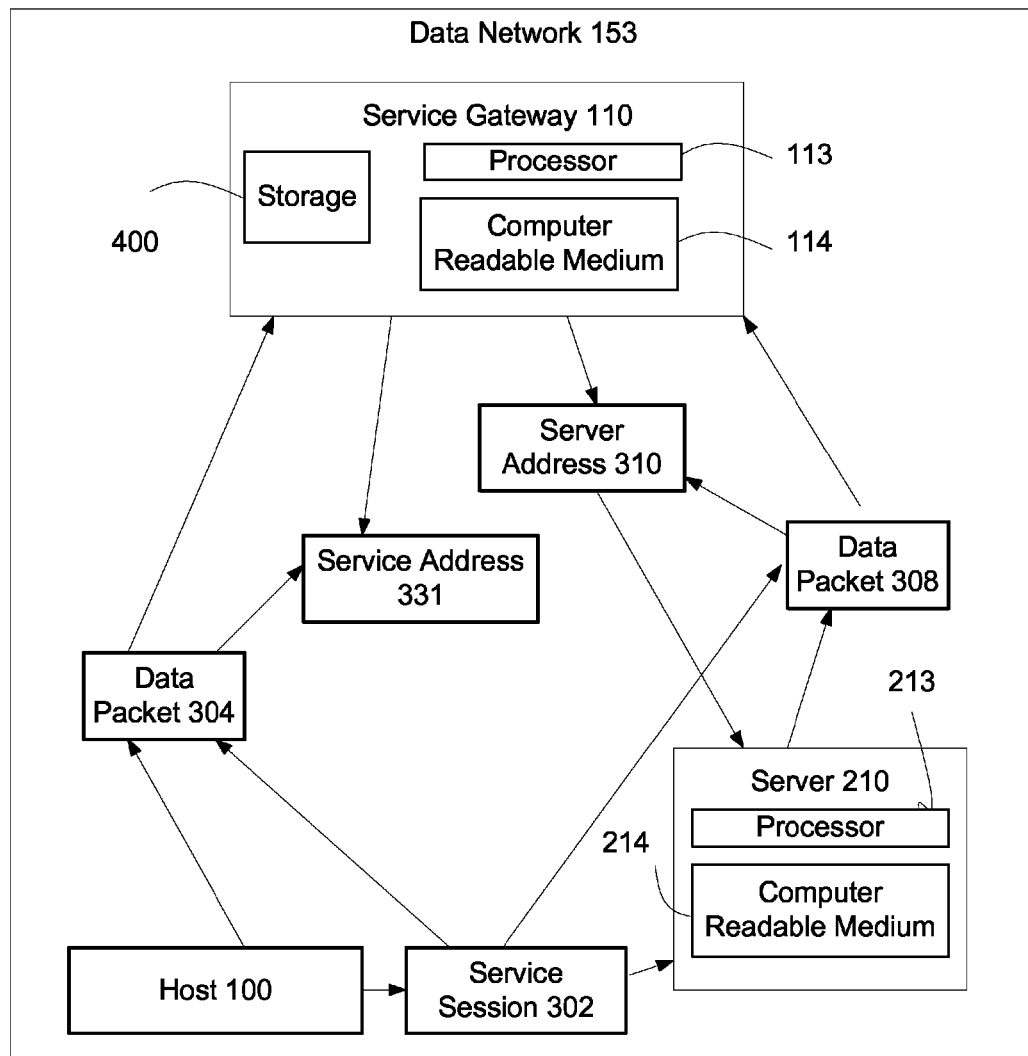
FIG. 1 illustrates an embodiment of a stateless service gateway between a host and a plurality of service addresses according to the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In an embodiment illustrated in FIG. 1, a service gateway 110 processes a service session 302 between a host 100 and a server 210. In one embodiment, service session 302 is a Web service session such as a HTTP (Hypertext Transport Protocol) session, a secure HTTP session, a FTP (File Transfer Protocol) session, a file transfer session, a SIP (Session Initiation Protocol) session, a session based on Web technology, a video or audio streaming session, a Web conferencing session, or any session over the Internet, corporate network, data center network, or a network cloud. Service session 302 includes a plurality of data packets between host 100 and server 210. Service session 302 is delivered over a data network 153.

Host 100 is a computing device with network access capabilities. In one embodiment, host 100 is a workstation, a desktop personal computer or a laptop personal computer. In one embodiment, host 100 is a Personal Data Assistant (PDA), a tablet PC, a smartphone, or a cellular phone. In one embodiment, host 100 is a set-top box, an Internet media viewer, an Internet media player, a smart sensor, a smart medical device, a net-top box, a networked television set, a networked DVR, a networked Blu-ray player, or a media center.

Service gateway 110 is operationally coupled to a processor 113 and a computer readable medium 114. The computer readable medium 114 stores computer readable program code, which when executed by the processor 113, implements the various embodiments of the present invention as described herein. In some embodiments, service gateway 110 is implemented as a server load balancer, an application delivery controller, a service delivery platform, a traffic manager, a security gateway, a component of a firewall system, a component of a virtual private network (VPN), a load balancer for video servers, or a gateway to distribute load to one or more servers.

Server 210 is operationally coupled to a processor 213 and a computer readable medium 214. The computer readable medium 214 stores computer readable program code, which when executed by the processor 213, implements the various embodiments of the present invention as described herein. In some embodiments, the computer readable program code implements server 210 as a Web server, a file server, a video server, a database server, an application server, a voice system, a conferencing server, a media gateway, a SIP server, a remote access server, a VPN server, a media center, an app server or a network server providing a network or application service to host 100.

In one embodiment, data network 153 is an Internet Protocol (IP) network. In one embodiment, data network 153 is a corporate data network or a regional corporate data network. In one embodiment, data network 153 is an Internet service provider network. In one embodiment, data network 153 is a residential data network. In one embodiment, data network 153 includes a wired network such as Ethernet. In one embodiment, data network 153 includes a wireless network such as a WiFi network, or cellular network. In one embodiment, data network 153 resides in a data center, or connects to a network or application network cloud.

In one embodiment, service session 302 includes a data packet 304 from host 100. Data packet 304 includes a service address 331. In one embodiment, service address 331 includes an IP address. In one embodiment, service address 331 includes an application layer address or a transport layer port number, such as transmission control protocol (TCP) port number or user datagram protocol (UDP) port number. Service address 331 is associated with service gateway 110 so that the service data packet 304 of service session 302 is processed by the service gateway 110. In one embodiment, service address 331 includes a destination IP address of service data packet 304, and optionally includes destination transport layer port number of service data packet 304.

Service gateway 110 determines a server address 310 associated with the service address 331 obtained from service data packet 304. In one embodiment, server address 310 includes a network address or IP address of server 210. In one embodiment, server address 310 includes an application layer address, such as a TCP port number or a UDP port number of server 210.

Based on server address 310, service gateway 110 modifies service data packet 304 by replacing service address 331 with server address 310. Service gateway 110 sends modified service data packet 304 to server 210.

In one embodiment, service gateway 110 receives a data packet 308 of service session 302 from server 210. Service gateway 110 processes data packet 308. Data packet 308 includes server address 310. Service gateway 110 determines a service address 331 associated with server address 310 obtained from service data packet 308. Service gateway 110 modifies data packet 308 by replacing server address 310 with service address 331. Service gateway 110 sends modified data packet 308 to host 100.

In one embodiment, service gateway 110 includes storage 400, and a service mapping table 412 (not shown) stored in storage 400. In one embodiment, storage 400 is a memory module residing in service gateway 110. In one embodiment, service gateway 110 includes a network processing module (not shown) comprising a field programmable gate array (FPGA), a network processor, an application specific integrated circuit (ASIC). Storage 400 is associated with the network processing module. Examples of storage 400 in this embodiment include a content addressable memory (CAM), a ternary content addressable memory (TCAM), a static random accessible memory (SRAM), or a dynamic random accessible memory (DRAM).

Figure 2:
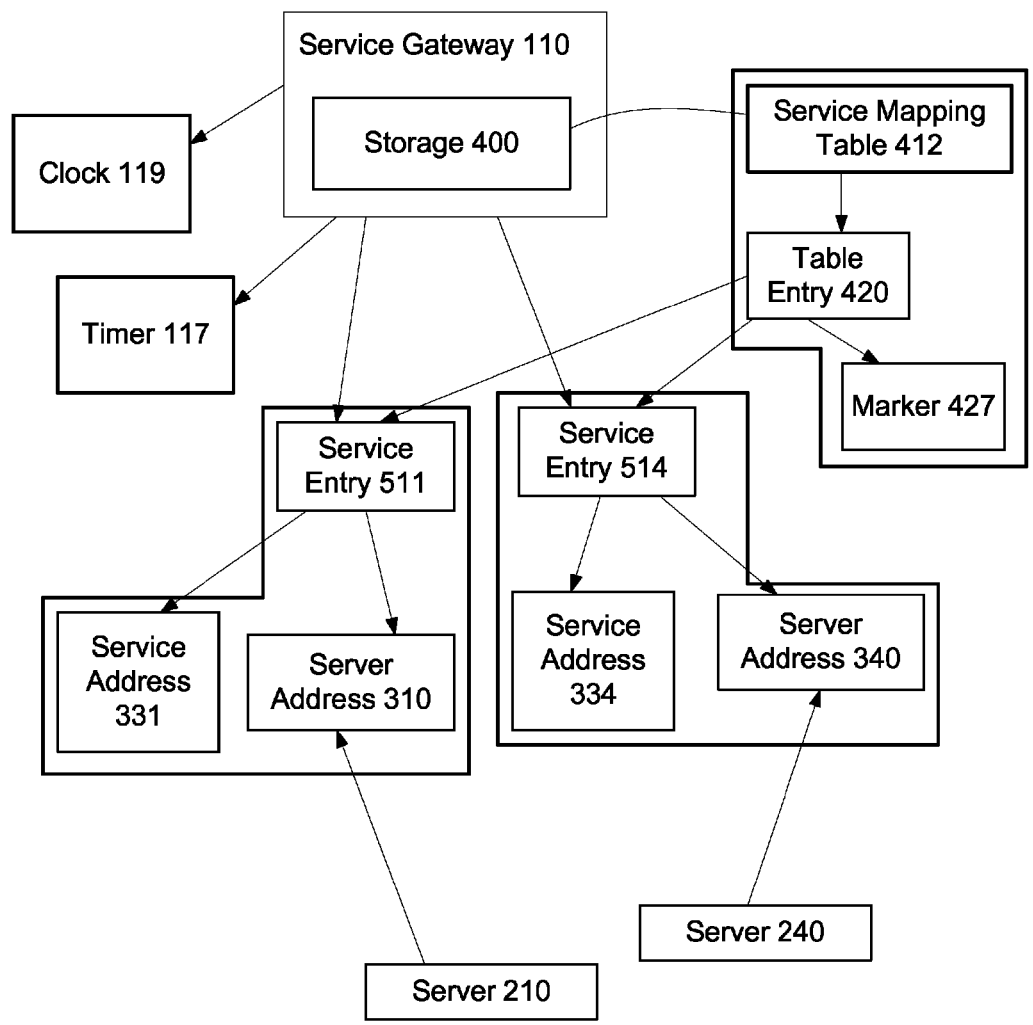
FIG. 2 illustrates an embodiment of a managed service mapping table for a stateless service gateway according to the present invention.

FIG. 2 illustrates an embodiment of a managed service mapping table 412 of service gateway 110 according to the present invention. In one embodiment, service gateway 110 includes a service entry 511 and a service entry 514. Service entry 511 includes service address 331 and server address 310, associating service address 331 and server address 310. Service entry 514 includes service address 334 and server address 340, associating service address 334 and server address 340. Server address 310 is different from server address 340. Server address 310 is associated with server 210 and server address 340 is associated with server 240. In one embodiment, server 210 is the same as server 240. Server address 310 associates with a server software application different from the server software application associated to server address 340. In one embodiment, server address 310 and server address 340 are associated with a same server software application whereas server 210 is different from server 240. In one embodiment, server address 310 and server address 340 are not related to each other.

In one embodiment, service mapping table 412 includes a service table entry 420 which is associated with service entry 511. Service gateway 110 may modify service table entry 420 from being associated with service entry 511 to being associated with service entry 514.

In one embodiment, for host 100 to use the service associated with service entry 514, service gateway 110 activates service entry 514. Service gateway 110 selects service table entry 420 to activate service entry 514, wherein service table entry 420 also has an association with service entry 511. A process for determining the service table entry 420 in order to activate service entry 514 is described further below with reference to FIG. 4.

In one embodiment, to deactivate the service associated with service entry 511, service gateway 110 removes service entry 511 from service table entry 420. Service gateway 110 selects service entry 514 to replace service entry 511 in service table entry 420. A process for selecting the service entry 514 to replace service entry 511 in service table entry 420 is described further below with reference to FIG. 5.

In one embodiment, service gateway 110 modifies service table entry 420 to include an association with a second service entry 514. Service table entry 420 is thus associated with both service entry 511 and service entry 514. In one embodiment, service gateway 110 stores a change marker 427 into service table entry 420. In one embodiment, service table entry 420 includes a change marker 427 and service gateway 110 modifies the change marker 427 value to "TRUE" to indicate that service table entry 420 includes two service entry associations. The association of service table entry 420 with two service entries indicates that one service entry is to be removed and is to be replaced by the other service entry will remain associated with service table entry 420.

In one embodiment, service gateway 110 is connected to a clock 119. Service gateway 110 includes a timer 117. Service gateway 110 sets timer 117 to a predetermined time period such as 10 minutes, 5 seconds, 2 minutes, or 1 hour. Service gateway 110 sets timer 117 while storing service entry 514 into service table entry 420. Service gateway 110 checks clock 119 to determine if timer 117 expires. When timer 117 expires, service gateway 110 changes marker 427 to "FALSE" or removes marker 427 from service table entry 420. Service gateway 110 also removes the association to service entry 511 from service table entry 420. The use of the timer 117 is described further below with reference to FIGS. 4 and 5.

FIGS. 3A-3F illustrate an embodiment of a data packet processing of service gateway using a service mapping table according to the present invention.

Figure 3A:
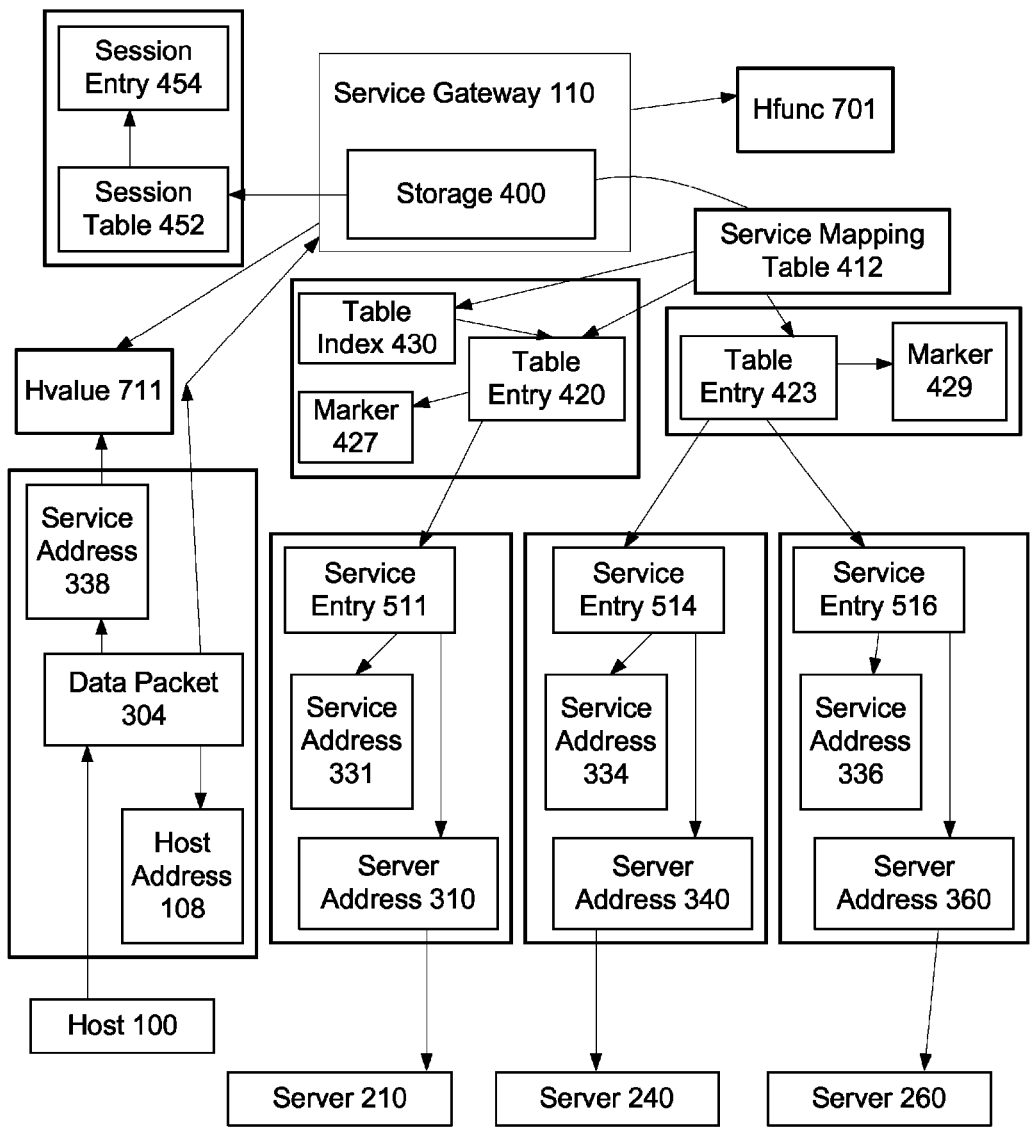
FIGS. 3A-3F illustrates an embodiment of a data packet processing method according to the present invention.

In one embodiment illustrated in FIG. 3A, service gateway 110 includes a session table 452 for storing information for sessions between hosts and servers. Session table 452 is stored in storage 400.

Service mapping table 412 includes a service table entry 420 and a service table entry 423. Service table entry 420 includes marker 427, which here has a value of "FALSE". The service table entry 420 is associated with service entry 511. Service entry 511 stores service address 331 and server address 310 associated with server 210.

Service table entry 423 includes marker 429, which here has a value of "TRUE". Service table entry 423 is associated with service entry 514 and service entry 516. Service entry 514 includes service address 334 and server address 340 associated with server 240. Service entry 516 stores service address 336 and server address 360 associated with server 260.

In one embodiment, service gateway 110 receives a data packet 304 from host 100. Service gateway 110 obtains service address 338 from data packet 304. Service gateway 110 compares service address 338 against service mapping table 412, and finds a match with service table entry 420.

In one embodiment, service mapping table 412 includes a plurality of service table entries. A service table entry 420 is indexed by a table index 430. In one embodiment, service mapping table 412 has 1000 entries and the table index 430 has an integer value between 0 and 999. In one embodiment, table index 430 has a value between 1 and 1000. In one embodiment table index has a value between 55 and 4897, or between −7 to 198024. In one embodiment, table index 430 has non-integer value.

In one embodiment, service gateway 110 includes a hash function HFunc 701. Service gateway 110 compares service address 338 against service mapping table 412 using HFunc 701.

Service gateway 110 applies HFunc 701 to service address 338 to obtain a hash value HValue 711. Service gateway 110 compares HValue 711 against service mapping table 412 to finds a match with table index 430. Service gateway 110 retrieves service table entry 420 using table index 430. In one embodiment, HValue 711 has the same value as table index 430.

Examples of hash functions HFunc 701 include CRC checksum functions and other checksum functions; hash functions using a combination of bit-wise operators such as bit-wise AND operator, bit-wise OR operator, bit-wise NAND operator and bit-wise XOR operator; MD5 hash functions and other cryptography hash functions; Jenkins hash function and other non-cryptography hash functions; hardware based hash functions implemented in FPGA, ASIC or an integrated circuit board of service gateway 110; and other types of hash functions or table lookup functions. Typically such hash functions are simple and can be calculated rapidly by service gateway 110.

Service gateway 110 checks marker 427 of service table entry 420. Marker 427 has a value "FALSE". Service gateway 110 modifies data packet 304 by replacing service address 338 with server address 310. Service gateway 110 sends modified data packet 304 to server 210, which is associated with server address 310.

Figure 3B:
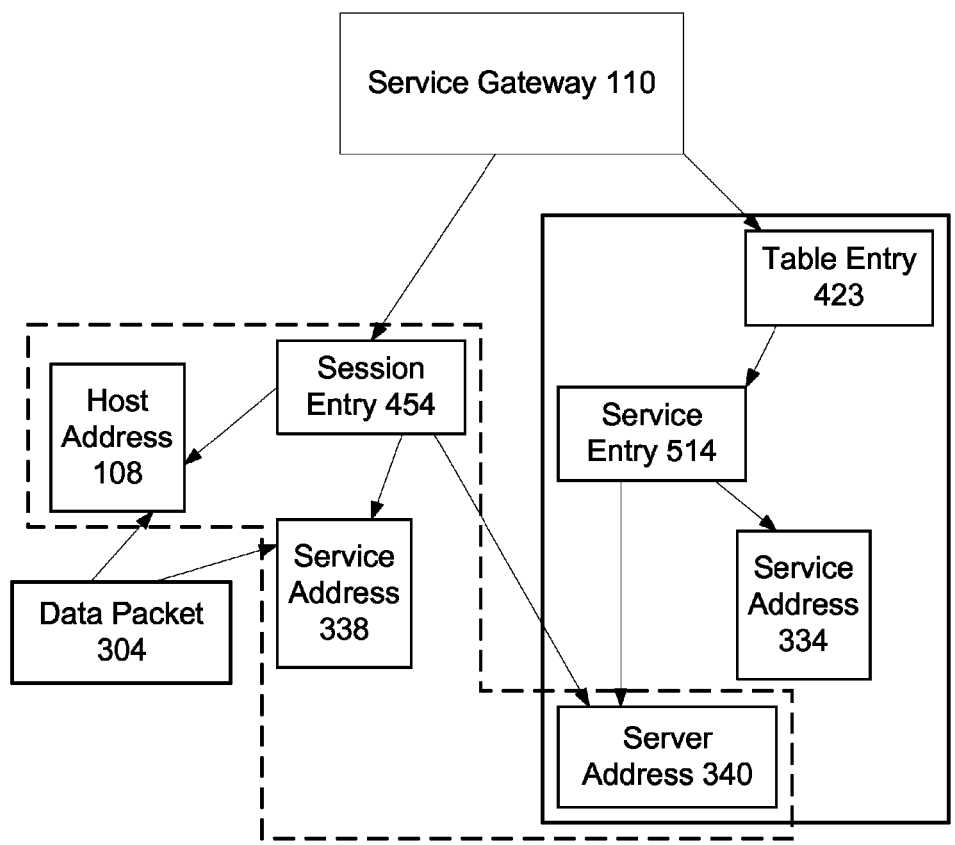

In one embodiment, assume that the service associated with service entry 514 is to be replaced by the service associated with service entry 516, i.e., service entry 514 is to be replaced by service entry 516 in service table entry 423. Service gateway 110 compares service address 338 with service table entry 423 and finds a match between service address 338 and service address 334 of the associated service entry 514. In response, service gateway 110 determines marker 429 of service table entry 423 to be "TRUE". Service gateway 110 creates a session entry 454 based on service table entry 423. Referring now to FIG. 3B, in one embodiment, service gateway 110 uses the associated service entry 514 of service table entry 423 to create session entry 454. Service gateway 110 obtains server address 340 from service entry 514, and stores service address 338 and server address 340 into session entry 454. In one embodiment, service gateway 110 obtains host address 108 from data packet 304 and stores host address 108 into session entry 454. Host address 108 is associated with host 100. In one embodiment, host address 108 includes an IP address or a network address of host 100. In one embodiment, host address 108 further includes an application layer address, a TCP port number, or a UDP port number of host 100. Service gateway 110 stores session entry 454 into session table 452. Service gateway 110 uses session entry 454 to process data packet 304. Service gateway 110 modifies data packet 304 by replacing service address 338 by server address 340 of session entry 454. Service gateway 110 sends modified data packet 304 to server 240.

Figure 3C:
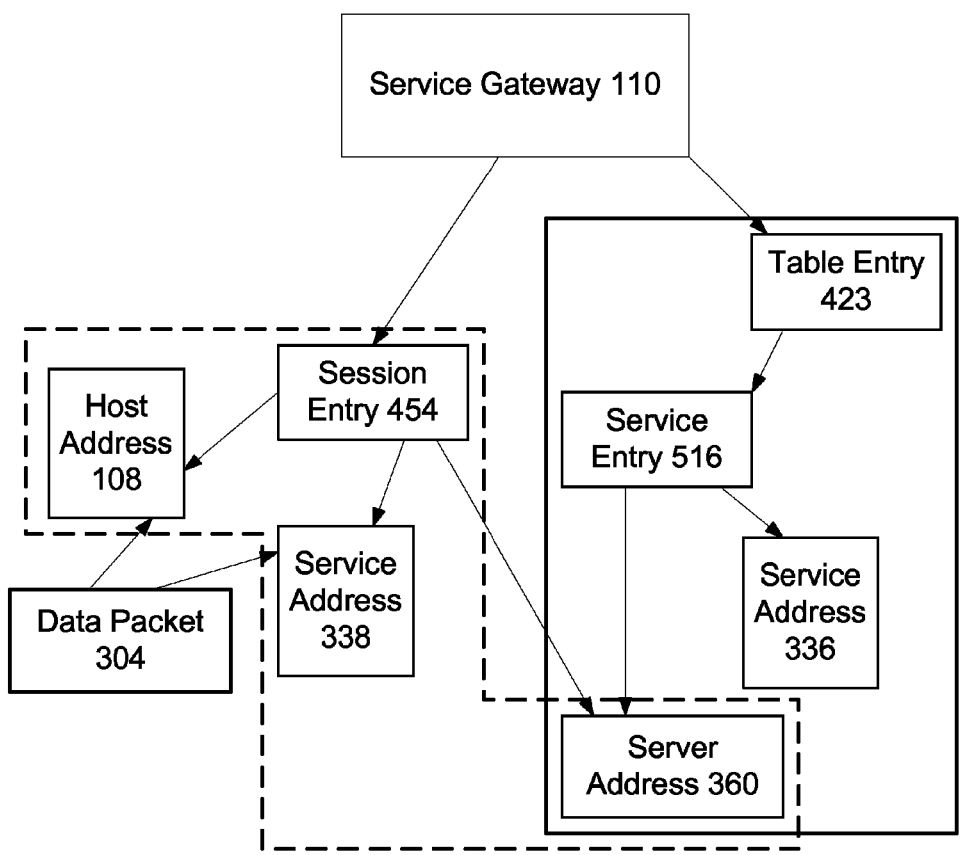

In one embodiment, service gateway 110 compares service address 338 against service table entry 423 and finds service address 338 matching service address 336 of the associated service entry 516 of service table entry 423, the new associated service entry. Service gateway 110 determines marker 429 of service table entry 423 to be "TRUE". Referring now to FIG. 3C, service gateway 110 uses service entry 516 to create session entry 454. Service gateway 110 stores service address 338, server address 360 of service entry 516 into session entry 454. In one embodiment, service gateway 110 stores host address 108 into session entry 454. Service gateway 110 modifies data packet 304 by replacing service address 338 by server address 360 and sends modified data packet 304 to server 260.

In one embodiment, service gateway 110 checks if data packet 304 includes a session request. For example, data packet 304 includes a TCP SYN packet. Service gateway 110 uses new associated service entry 516 of service table entry 423 to create session entry 454, as described above with reference to FIG. 3C.

In one embodiment, service gateway 110 compares data packet 304 against session table 452 prior to comparing data packet 304 against service mapping table 412. In one embodiment, service gateway 110 matches service address 338 of data packet 304 against session table 452. In one embodiment, service gateway 110 further obtains host address 108 of data packet 304, and compares service address 338 and host address 108 against session table 452. In an embodiment, service gateway 110 finds a match with session entry 454. Service gateway 110 modifies data packet 304 by replacing service address 338 of data packet 304 by server address of session entry 420, and sends modified data packet 304 to the associated server of the server address of session entry 454.

In one embodiment, service gateway 110 does not find a match between data packet 304 and session table 452. In response, service gateway 110 proceeds to compare data packet 304 against service mapping table 412, as described above.

Figure 3D:
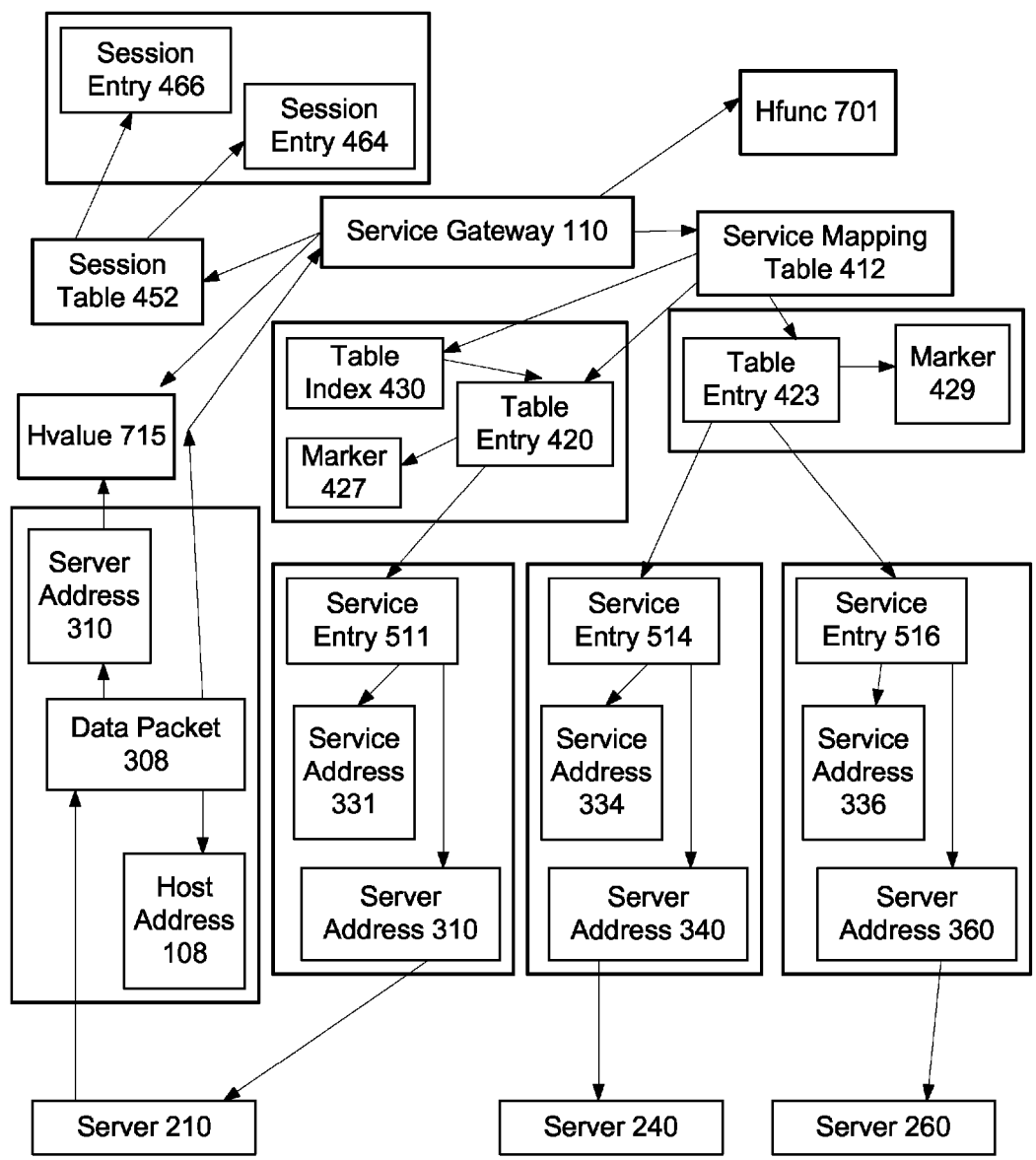
Figure 3E:
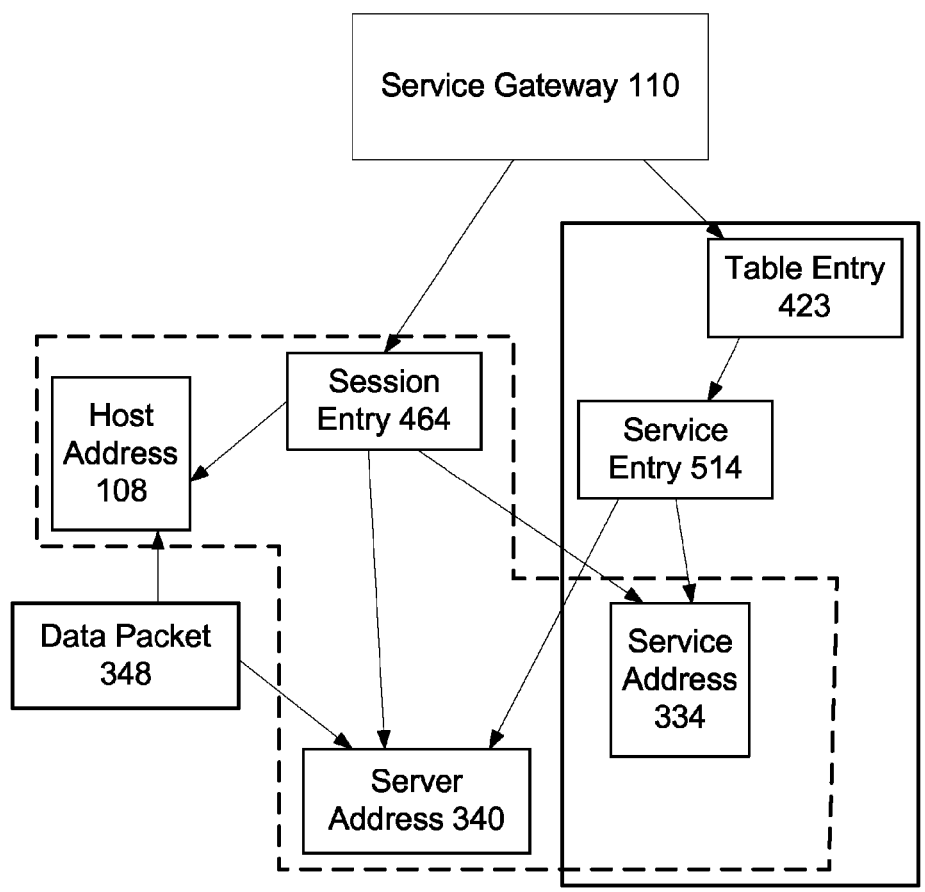

Referring now to FIG. 3D, in one embodiment, service gateway 110 receives a data packet 308 from a server. In one embodiment, service gateway 110 receives data packet 308 from server 210. Service gateway 110 obtains server address 310 of data packet 308, compares server address 310 against service mapping table 412, and finds a match with service table entry 420. In one embodiment, service gateway 110 applies hash function HFunc 701 to server address 310 to obtain HValue 715. Service gateway 110 compares HValue 715 against service mapping table 412 and finds a match with table index 430. Service gateway 110 retrieves service table entry 420 using table index 430. Service gateway 110 checks marker 427 of service table entry 420 to be "FALSE". Service gateway 110 modifies data packet 308 by replacing server address 310 by service address 331 of service entry 511 of service table entry 420. Service gateway 110 sends modified data packet 308 to host 100.

In one embodiment, service gateway 110 receives data packet 348 from server 240. Service gateway 110 obtains server address 340 of data packet 348, and compares server address 340 against service mapping table 412. Service gateway 110 finds a match with service table entry 423. Service gateway 110 checks marker 429 of service table entry 423 to be "TRUE". In response, referring to FIG. 3E, service gateway 110 creates a session entry 464 (FIG. 3E) using server address 340 and service table entry 423. Service gateway 110 stores server address 340 in session entry 464. Service gateway 110 further checks and determines server address 340 matches the existing associated service entry 514 of service table entry 423. Service gateway 110 associates session entry 464 to service address 334 of service entry 514 in session entry 464. Service gateway 110 stores the session entry 464 in the session table 452. In one embodiment, service gateway 110 extracts host address 108 from data packet 348 and stores host address 108 in session entry 464 as well.

Service gateway 110 modifies data packet 348 by replacing server address 340 with service address 331, and sends modified data packet 348 to host 100, which is associated with host address 108.

Figure 3F:
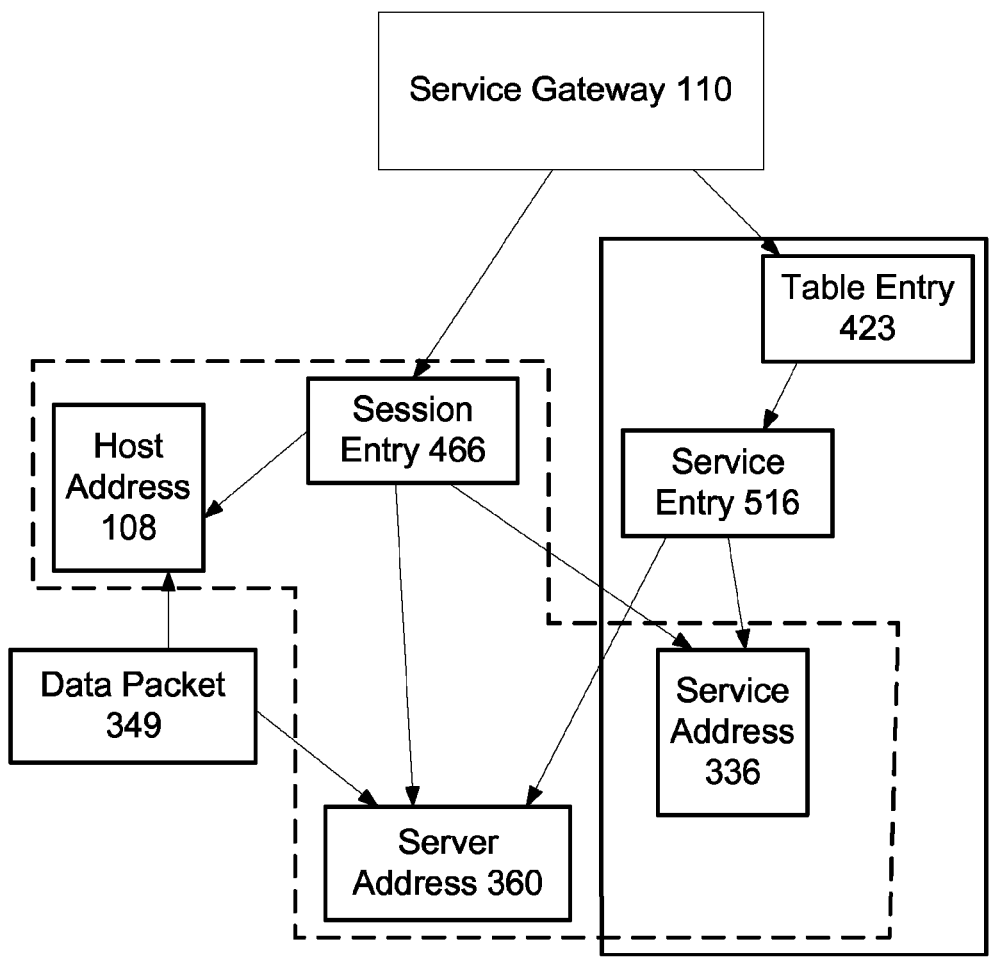

In one embodiment, service gateway 110 receives data packet 349 from server 260. Service gateway 110 obtains server address 360 of data packet 349, and compares server address 360 against service table entry 423. Service gateway 110 finds a match with service table entry 423. Service gateway 110 checks marker 429 of service table entry 423 to be "TRUE". Service gateway 110 further determines server address 360 of data packet 349 matches server address 360 of service entry 516 associated with service table entry 423. Referring now to FIG. 3F, service gateway 110 creates a session entry 466 using server address 360 and service entry 516. Service gateway 110 stores server address 360 and service address 336 of service entry 516 into session entry 466. Service gateway 110 stores session entry 466 into session table 452. In one embodiment, service gateway 110 extracts host address 108 from data packet 349 and stores host address 108 into session entry 466.

Service gateway 110 modifies data packet 349 by replacing server address 360 with service address 336, and sends modified data packet 349 to host 100 corresponding to host address 108.

In one embodiment, service gateway 110 compares data packet 349 against session table 452 prior to comparing data packet 349 against service mapping table 412. Service gateway 110 obtains server address 360 of data packet 308 and compares server address 360 against session table 452. In one embodiment, service gateway 110 obtains further host address 108 of data packet 308 and matches server address 360 together with host address 108 against session table 452. In an embodiment, service gateway 110 finds a match with session entry 466. Service gateway 110 modifies data packet 308 by replacing server address 360 of data packet 304 by service address 336 of session entry 466, and sends modified data packet 349 to host 100 associated to host address 108.

In one embodiment, service gateway 110 does not find a match between data packet 308 and session table 452. Service gateway 110 proceeds to compare data packet 308 against service mapping table 412, as described above.

In one embodiment, service gateway 110 uses session entry 466 created using data packet 308 received from server 260, in comparing subsequent host-side session data packet against session table 452. In one embodiment, service gateway 110 uses session entry 454 created using data packet 304 received from host 100, in comparing subsequent server-side session data packets against session table 452.

Figure 4:
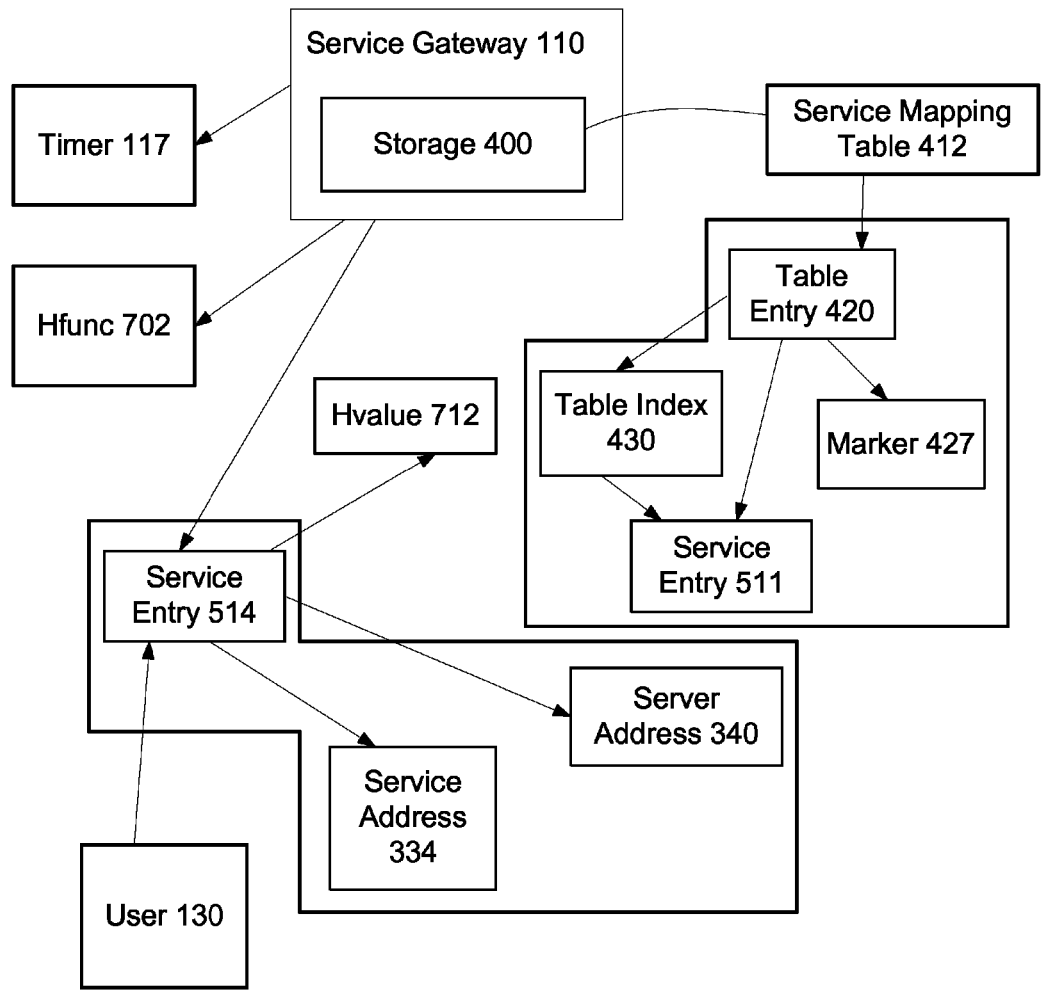
FIG. 4 illustrates an embodiment of a process to add a service entry according to the present invention.

FIG. 4 illustrates an embodiment of a process to activate a service entry according to the present invention. In one embodiment, service mapping table 412 includes service table entry 420 indexed by table index 430. Service table entry 420 is associated with service entry 511.

Service gateway 110 includes a hash function HFunc 702. In one embodiment, HFunc 702 is the same as HFunc 701. In one embodiment, HFunc 702 is different from HFunc 701.

In one embodiment, service gateway 110 activates service entry 514, which includes service address 334 and server address 340. In one embodiment, service gateway 110 receives service entry 514 from a user 130. In one embodiment, user 130 is a network administrator, or a network management system. In one embodiment, service gateway receives service entry 514 from a pre-determined configuration retrieved from storage or received remotely from a network.

Service gateway 110 applies hash function HFunc 702 to service entry 514 to obtain a hash value HValue 712. In one embodiment, HFunc 702 is applied to service address 334. In one embodiment, HFunc 702 is applied to server address 340. In one embodiment, HFunc 702 is applied to both service address 334 and server address 340. Service gateway 110 calculates a hash value HValue 712. In one embodiment, hash value HValue 712 matches table index 430 of service mapping table 412. Service gateway 110 retrieves service table entry 420 using table index 430. Service gateway 110 adds an association with service entry 514 to service table entry 420 so that service table entry 420 is associated with both service entry 511 and service entry 514. In one embodiment, service gateway 110 stores a change marker 427 to service table entry 420 or sets the change marker 427 value to "TRUE".

In one embodiment, service gateway 110 set a timer 117 for the activation or service entry 514. When timer 117 expires. Service gateway 110 removes the association with service entry 511 from service table entry 420. Service gateway 110 removes change marker 427 from service table entry 420 or changes the value of marker 427 to "FALSE". Service table entry 420 maintains the association with service entry 514. By setting the time 117, existing connections related to service entry 511 may be migrated to the session table 452, as described above, prior to the removal of service entry 511 from service table entry 420, reducing disruptions to existing session connections.

Figure 5:
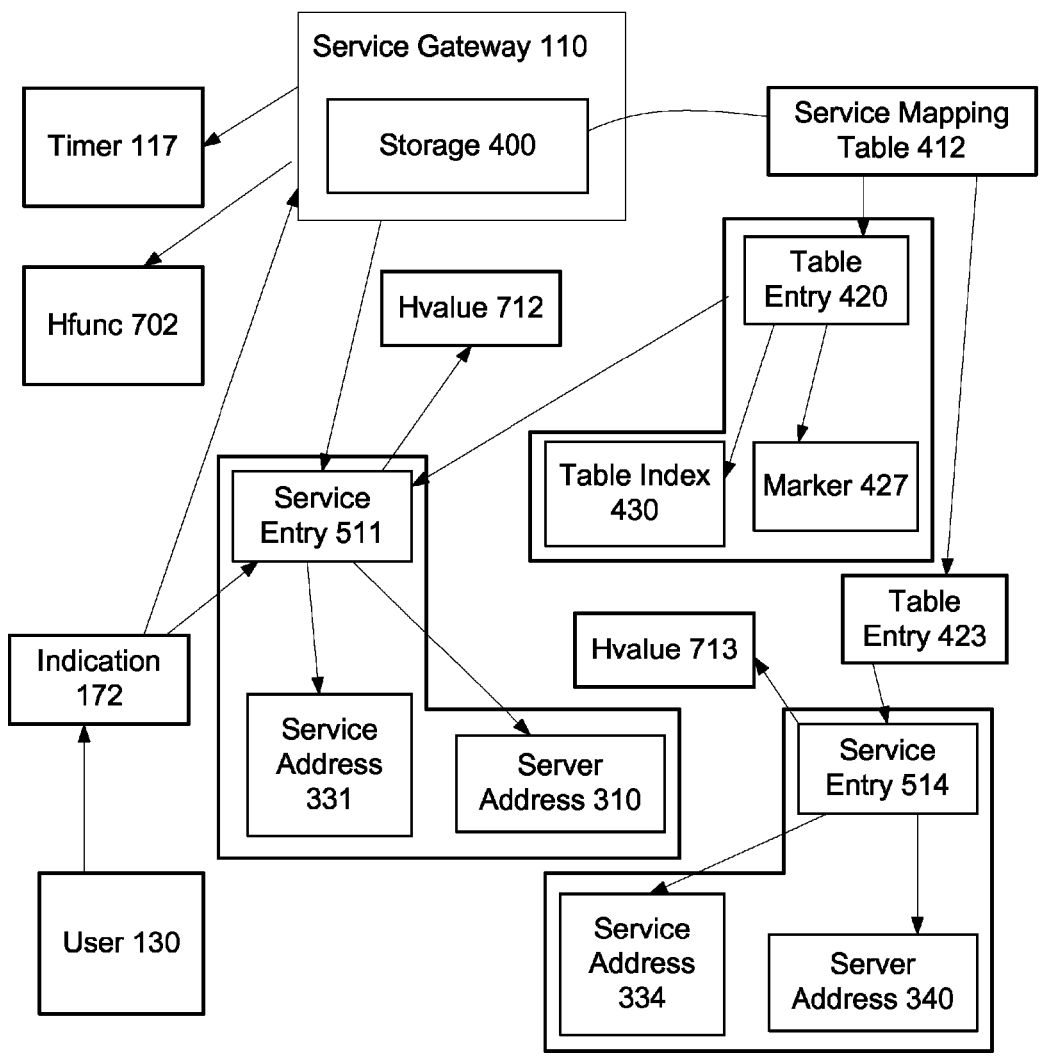
FIG. 5 illustrates an embodiment of a process to remove a service entry according to the present invention.

FIG. 5 illustrates a process to deactivate a service entry 511. Service mapping table 412 includes a service table entry 420 associated with service entry 511. Service mapping table 412 further includes a second service table entry 423 associated with service entry 514 different from service entry 511, such as a deactivate command or request. Service gateway 110 receives a deactivate indication 172 to deactivate service entry 511. In one embodiment, service gateway 110 receives the indication 172 from user 130. In one embodiment, service gateway 110 receives the indication 172 from a pre-determined configuration retrieved from storage or remotely over a data network.

Indication 172 includes service entry 511. Service entry 511 includes service address 331 and server address 310. Service gateway 110 obtains service entry 511 from indication 172.

In one embodiment, service gateway 110 calculates a hash value HValue 712 by applying HFunc 702 to service entry 511. In one embodiment, service gateway 110 applies HFunc 702 to service address 331 of service entry 511. In one embodiment, service gateway 110 applies HFunc 702 to server address 310 of service entry 511. In one embodiment, service gateway applies HFunc 702 to both service address 331 and server address 310. Service gateway 110 compares HValue 712 against service mapping table 412 and finds a match with table index 430. Service gateway 110 retrieves service table entry 420 using table index 430 from service mapping table 412.

In one embodiment, service gateway 110 compares service entry 511 against service mapping table 412. In one embodiment, service gateway 110 compares service address 331 of service entry 511 to service address 331 of service table entry 420 and finds a match. In one embodiment, service gateway 110 compares server address 310 of service entry 511 to server address 310 of service table entry 420 and finds a match. In one embodiment, service gateway 110 compares both service address 331 and server address 310 of service entry 511 and finds a match with service table entry 420. Service gateway 110 determines table index 430 of the matching service table entry 420.

Service gateway 110 proceeds to select a replacement service entry 514 for service table entry 423. In one embodiment, in selecting service entry 514 from service mapping table 412, service gateway 110 selects a service table entry 423 and applies hash function HFunc 702 to service entry 514 of service table entry 423. Service gateway 110 calculates a hash value HValue 713 by applying HFunc 702 to service entry 514. Service gateway 110 compares HValue 713 to table index 430 and finds a match. Service gateway 110 adds an association with service entry 514 to service table entry 420 so that service table entry 420 is associated with both service entry 511 and service entry 514. In one embodiment, service gateway 110 stores a change marker 427 to service table entry 420 or sets the change marker 427 value to "TRUE". In one embodiment, service gateway 110 selects service entry 514 by applying the hash function HFunc 702 to one or more service entries in service mapping table 412.

In one embodiment, service gateway 110 set a timer 117 for the activation of service entry 514. When timer 117 expires. Service gateway 110 removes the association with service entry 511 from service table entry 420. Service gateway 110 remove change marker 427 from service table entry 420 or changes the value of marker 427 to "FALSE". Service table entry 420 maintains an association with service entry 514.

In one embodiment, service table entry 420 includes a pre-determined alternate association service entry 514. In one embodiment, service gateway 110 selects service entry 514 by retrieving the alternate association service entry 514 of service table entry 420 from storage or remotely over a data network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A system for processing an uninterrupted service session comprising:
a service gateway communicatively coupled to a host using a first network and to a plurality of servers using a second network, the service gateway processing a service session between the host and at least one of the plurality of servers, the service gateway including a processor coupled to a memory, the memory storing instructions executable by the processor to perform a method comprising:
getting a first service entry, the first service entry including a service address and a first server address, the first service address including an address associated with the service gateway and a service identifier;
storing the first service entry with an active status designation in a service table entry of a service mapping table, the service mapping table including a plurality of service table entries, the table entry associated with the service;
starting a timer in response to storing the first service entry to calculate when a predetermined amount of time has elapsed;
changing a status designation of a second service entry to an inactive status designation in response to the timer having calculated the predetermined amount of time has elapsed, the second service entry stored in the service table entry, the second service entry including the service address and a second server address;
receiving a first data packet from the host, the first data packet including the service address;
determining a first server address associated with the service address using the first service entry;
modifying the first data packet, the modifying including replacing the service address with the first server address; and
forwarding the modified first data packet to the first server address.

2. The system of claim 1 wherein the method further comprises:
receiving a second data packet from the host, the second data packet including the service address;
determining a second server address associated with the service address;
modifying the second data packet, the modifying including replacing the service address with the second server address; and
forwarding the modified second data packet to the second server address.

3. The system of claim 2 wherein the determining the second server address comprises:
retrieving from the service mapping table the second service entry in the service table entry corresponding to the service address; and
identifying the second server address in the second service entry.

4. The system of claim 2 wherein the service mapping table is indexed using a hash function and the index is stored in a table index, and wherein the determining the second server address comprises:
applying the hash function to the service address to generate a hash value;
retrieving from the service mapping table the second service entry in the service table entry corresponding to the service address using the hash value and the status designation of the second service entry; and
identifying the second server address in the second service entry.

5. The system of claim 4 wherein the hash function is at least one of: a checksum function, a cyclic redundancy check (CRC) function, bit-wise AND operator, bit-wise OR operator, bit-wise NAND operator, bit-wise NOR operator, MD5 hash function, cryptographic hash function, Jenkins hash function, table lookup function, hash function performed by an application specific integrated circuit (ASIC), and hash function performed by a field programmable gate array (FPGA).

6. The system of claim 1 wherein the determining the first server address comprises:
retrieving from the service mapping table the first service entry in the service table entry corresponding to the service address; and
identifying the first server address in the first service entry.

7. The system of claim 5 wherein the service table entry is indexed using a hash function and the index is stored in a table index, and wherein the determining the first server address comprises:
applying the hash function to the service address to generate a hash value;
retrieving from the service mapping table the first service entry in the service table entry corresponding to the service address using the hash value and the status designation of the first service entry; and
identifying the first server address in the first service entry.

8. The system of claim 7 wherein the hash function is at least one of: a checksum function, a cyclic redundancy check (CRC) function, bit-wise AND operator, bit-wise OR operator, bit-wise NAND operator, bit-wise NOR operator, MD5 hash function, cryptographic hash function, Jenkins hash function, table lookup function, hash function performed by an application specific integrated circuit (ASIC), and hash function performed by a field programmable gate array (FPGA).

9. The system of claim 1 wherein
the service address includes at least one of: a destination Internet Protocol (IP) address, an application layer address, and a destination transport layer port number,
the transport layer port number being at least one of a: transmission control protocol (TCP) port number and a user datagram protocol (UDP) port number, and
the service identifier identifying at least one of a: Hypertext Transport Protocol (HTTP) session, a secure HTTP session, a File Transfer Protocol (FTP) session, a file sharing protocol session; a Session Initiation Protocol (SIP) session, a web session, a video and/or audio streaming session, and a web conferencing session.

10. A method for processing an uninterrupted service session by a service gateway communicatively coupled to a host using a first network and to a plurality of servers using a second network, the service gateway processing a service session between the host and at least one of the plurality of servers, the method comprising:
  getting a first service entry, the first service entry including a service address and a first server address, the first service address including an address associated with the service gateway and a service identifier;
  storing the first service entry with an active status designation in a service table entry of a service mapping table, the service mapping table including a plurality of service table entries, the table entry associated with the service;
  starting a timer in response to storing the first service entry to calculate when a predetermined amount of time has elapsed; changing a status designation of a second service entry to an inactive status designation in response to the timer having calculated the predetermined amount of time has elapsed, the second service entry stored in the service table entry, the second service entry including the service address and a second server address;
  receiving a first data packet from the host, the first data packet including the service address;
  determining a first server address associated with the service address using the first service entry;
  modifying the first data packet, the modifying including replacing the service address with the first server address; and
  forwarding the modified first data packet to the first server address.

11. The method of claim 10 further comprising:
  receiving a second data packet from the host, the second data packet including the service address;
  determining a second server address associated with the service address;
  modifying the second data packet, the modifying including replacing the service address with the second server address; and
  forwarding the modified second data packet to the second server address.

12. The method of claim 11 wherein the determining the second server address comprises:
  retrieving from the service mapping table the second service entry in the service table entry corresponding to the service address; and
  identifying the second server address in the second service entry.

13. The method of claim 11 wherein the service mapping table is indexed using a hash function and the index is stored in a table index, and wherein the determining the second server address comprises:
  applying the hash function to the service address to generate a hash value;
  retrieving from the service mapping table the second service entry in the service table entry corresponding to the service address using the hash value and the status designation of the second service entry; and
  identifying the second server address in the second service entry.

14. The method of claim 13 wherein the hash function is at least one of: a checksum function, a cyclic redundancy check (CRC) function, bit-wise AND operator, bit-wise OR operator, bit-wise NAND operator, bit-wise NOR operator, MD5 hash function, cryptographic hash function, Jenkins hash function, table lookup function, hash function performed by an application specific integrated circuit (ASIC), and hash function performed by a field programmable gate array (FPGA).

15. The method of claim 10 wherein the determining the first server address comprises:
  retrieving from the service mapping table the first service entry in the service table entry corresponding to the service address; and
  identifying the first server address in the first service entry.

16. The method of claim 14 wherein the service table entry is indexed using a hash function and the index is stored in a table index, and wherein the determining the first server address comprises:
  applying the hash function to the service address to generate a hash value;
  retrieving from the service mapping table the first service entry in the service table entry corresponding to the service address using the hash value and the status designation of the first service entry; and
  identifying the first server address in the first service entry.

17. The method of claim 16 wherein the hash function is at least one of: a checksum function, a cyclic redundancy check (CRC) function, bit-wise AND operator, bit-wise OR operator, bit-wise NAND operator, bit-wise NOR operator, MD5 hash function, cryptographic hash function, Jenkins hash function, table lookup function, hash function performed by an application specific integrated circuit (ASIC), and hash function performed by a field programmable gate array (FPGA).

18. The method of claim 10 wherein
  the service address includes at least one of: a destination Internet Protocol (IP) address, an application layer address, and a destination transport layer port number,
  the transport layer port number being at least one of a: transmission control protocol (TCP) port number and a user datagram protocol (UDP) port number, and
  the service identifier identifying at least one of a: Hypertext Transport Protocol (HTTP) session, a secure HTTP session, a File Transfer Protocol (FTP) session, a file sharing protocol session; a Session Initiation Protocol (SIP) session, a web session, a video and/or audio streaming session, and a web conferencing session.

19. A method for processing an uninterrupted service session by a service gateway communicatively coupled to a host using a first network and to a plurality of servers using a second network, the service gateway processing a service session between the host and at least one of the plurality of servers, the method comprising:
  receiving a first data packet from the host, the first data packet including a service address;
  applying a hash function to the service address to generate a hash value;
  retrieving from a service mapping table a first service entry in a service table entry corresponding to the service address using the hash value and a status designation of the first service entry, the service mapping table including a plurality of service table entries and being indexed using the hash function, the index being stored in a table index, the first service entry being stored in the service table entry and including the service address and a second server address, the service table entry being associated with a service;

identifying the first server address in the first service entry;
modifying the first data packet, the modifying including replacing the service address with the first server address;
forwarding the modified first data packet to the first server address;
getting a second service entry, the second service entry including the service address and a second server address, the second service address including an address associated with the service gateway and a service identifier;
storing the second service entry with an active status designation in the service table entry of the service mapping table;
starting a timer in response to storing the first service entry to calculate when a predetermined amount of time has elapsed;
changing a status designation of the first service entry to an inactive status designation in response to the timer having calculated the predetermined amount of time has elapsed;
receiving a second data packet from the host, the second data packet including the service address;
retrieving from the service mapping table the second service entry in the service table entry corresponding to the service address using the hash value and the status designation of the second service entry;
identifying the second server address in the second service entry;
modifying the second data packet, the modifying including replacing the service address with the second server address; and
forwarding the modified second data packet to the second server address.

* * * * *